(12) United States Patent
Do et al.

(10) Patent No.: US 9,547,068 B2
(45) Date of Patent: Jan. 17, 2017

(54) METHODS, SYSTEMS AND DEVICES FOR PROVIDING LOCATION BASED SERVICES IN A VENUE

(71) Applicant: QUALCOMM Incorporated, San Diego, CA (US)

(72) Inventors: Ju-Yong Do, Palo Alto, CA (US); Gengsheng Zhang, Cupertino, CA (US); Sundar Raman, Fremont, CA (US); Chandrakant Mehta, Santa Clara, CA (US); Arie Rahmat, San Diego, CA (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/476,658

(22) Filed: Sep. 3, 2014

(65) Prior Publication Data
US 2015/0126217 A1    May 7, 2015

Related U.S. Application Data

(60) Provisional application No. 61/901,360, filed on Nov. 7, 2013.

(51) Int. Cl.
| | |
|---|---|
| *H04W 24/00* | (2009.01) |
| *G01S 5/10* | (2006.01) |
| *H04W 4/04* | (2009.01) |
| *G01S 5/02* | (2010.01) |
| *H04W 4/02* | (2009.01) |

(Continued)

(52) U.S. Cl.
CPC ............ *G01S 5/10* (2013.01); *G01S 5/0252* (2013.01); *G01S 5/0263* (2013.01); *G01S 19/48* (2013.01); *H04W 4/02* (2013.01); *H04W 4/04* (2013.01); *H04W 24/00* (2013.01); *H04W 64/00* (2013.01); *H04W 4/027* (2013.01)

(58) Field of Classification Search
CPC .......... H04W 4/22; H04W 64/00; H04W 4/02; H04W 80/04; H04W 28/04; H04L 29/08108; H04L 2012/5607; G01S 5/12; G01S 19/40; G01S 1/022
USPC ..... 455/456.1–457, 404.2, 414.1; 370/310.2, 370/328, 329; 342/357.2, 0.23, 0.49
See application file for complete search history.

(56) References Cited

U.S. PATENT DOCUMENTS

| | | | |
|---|---|---|---|
| 6,625,451 B1 * | 9/2003 | La Medica, Jr. | H04W 48/18 455/432.1 |
| 6,741,556 B1 | 5/2004 | Seddigh et al. | |

(Continued)

OTHER PUBLICATIONS

International Search Report and Written Opinion—PCT/US2014/064450—ISA/EPO—Apr. 28, 2015.

*Primary Examiner* — Steve D Agosta
(74) *Attorney, Agent, or Firm* — Berkeley Law & Technology Group, LLP

(57) ABSTRACT

Disclosed are methods, systems and devices for providing location based services in a venue. To estimate its location, in a particular implementation, a mobile device may obtain a measurement of a range to a transponder device positioned at a known location based on measurements of a signal round-trip time (RTT) in a message exchange with the transponder device. Positioning assistance data from a server may enable the mobile device to measure a delay at the transponder device in providing a response to a probe message to thereby more accurately measure the signal RTT.

4 Claims, 9 Drawing Sheets

(51) Int. Cl.
*H04W 64/00* (2009.01)
*G01S 19/48* (2010.01)

(56) References Cited

U.S. PATENT DOCUMENTS

| | | | | |
|---|---|---|---|---|
| 7,509,129 | B2* | 3/2009 | Sinivaara | H04L 47/125 370/329 |
| 8,190,156 | B2* | 5/2012 | Rantanen | H04W 48/18 455/435.1 |
| 8,219,090 | B2* | 7/2012 | Hosain | H04W 48/18 455/432.1 |
| 8,335,507 | B1* | 12/2012 | Mangal | H04W 8/183 455/419 |
| 2002/0168976 | A1* | 11/2002 | Krishnan | H04W 48/18 455/432.1 |
| 2004/0063427 | A1* | 4/2004 | Narasimha | H04W 48/18 455/434 |
| 2005/0085228 | A1* | 4/2005 | Welnick | H04W 48/18 455/432.1 |
| 2005/0130661 | A1* | 6/2005 | Aerrabotu | H04W 48/08 455/437 |
| 2006/0199608 | A1* | 9/2006 | Dunn | H04W 36/14 455/552.1 |
| 2010/0202298 | A1 | 8/2010 | Agarwal et al. | |
| 2010/0283677 | A1* | 11/2010 | Halivaara | G01S 19/25 342/357.49 |
| 2010/0331012 | A1* | 12/2010 | Zhang | G01S 5/0242 455/456.2 |
| 2012/0269170 | A1 | 10/2012 | Chen et al. | |
| 2013/0054783 | A1 | 2/2013 | Ge et al. | |

* cited by examiner

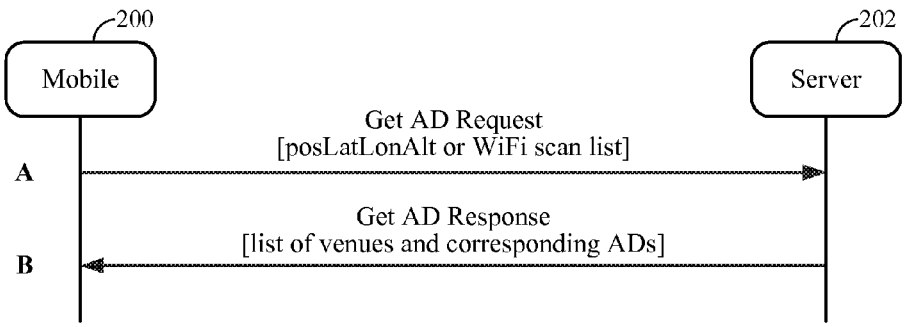

FIG. 3

| Field | M/O | BSON Data Type | Notes, Required Values |
|---|---|---|---|
| MAC | M | binary | AP base MAC address in 6 byte length binary |
| AP_GROUP_ID | O | Int32 | AP group identification number, assigned locally and applicable only within this LCI, with a value from 1 to N (e.g. 1, 2, 3,..., N for N separate AP groups in this LCI). An AP_GROUP_ID is populated and allocated only to a group of APs which are known to be same model. Otherwise, not to be populated. |
| AP_MODEL | O | string | AP model |
| AP_VENDOR | O | string | AP vendor |
| WLAN_CHIP_MODEL | O | string | WLAN chip model |
| WLAN_CHIP_VENDOR | O | string | WLAN chip vendor. |

FIG. 4

METHODS, SYSTEMS AND DEVICES FOR PROVIDING LOCATION BASED SERVICES IN A VENUE

RELATED APPLICATIONS

This application claims the benefit of U.S. Provisional Application No. 61/901,360, filed Nov. 7, 2013, entitled, "METHODS, SYSTEMS AND DEVICES FOR PROVIDING LOCATION BASED SERVICES IN A VENUE," which is assigned to the assignee hereof and incorporated herein by reference.

BACKGROUND

Field

Embodiments described herein are directed to application of mobile navigation techniques.

Information

The global positioning system (GPS) and other like satellite positioning systems (SPSs) have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, received signal strength indicator (RSSI), round trip delay (RTT), just to name a few examples. In other applications, measured RSSI and RTT values may be compared with expected signature values at locations defined in a radio "heatmap" to determine a match. Here, a location of a mobile device may be estimated as a discrete location defined in the radio heatmap corresponding with expected signature value(s) matching measured RSSI and/or RTT.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 3 illustrates a request for positioning assistance data in a message from a mobile device and a response message including positioning assistance data according to an embodiment.

FIG. 4 illustrates an aspect of positioning assistance data according to an embodiment.

SUMMARY

Figure 1:
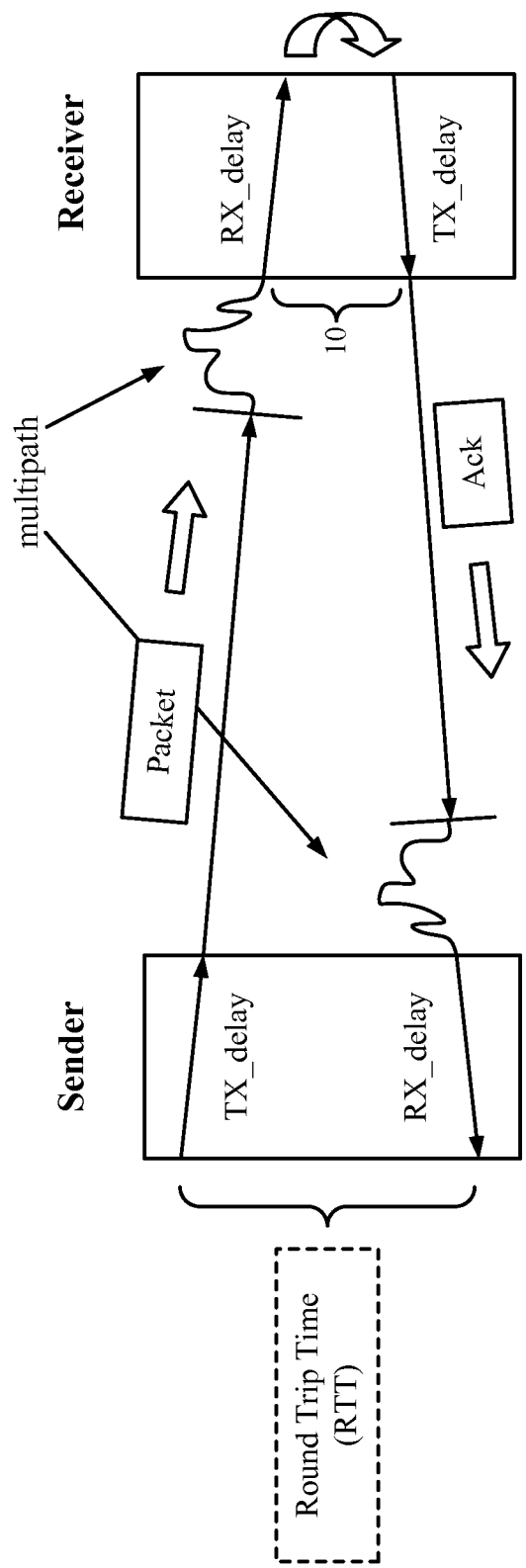
FIG. 1 is a diagram illustrating how a turnaround calibration factor (TCF) may affect a round-trip time (RTT) measurement in accordance with an implementation.

Briefly, particular implementations are directed to a method at a mobile device comprising: receiving one or more messages comprising positioning assistance data, the positioning assistance data comprising description of attributes of a plurality of wireless transponders, said one or more messages identifying at least two of the wireless transponders as being in a group of wireless transponders having similar attributes; estimating a delay in connection with a round-trip exchange of messages with wireless transponders in the group based, at least in part, on measurements obtained from one or more wireless transponders in the group; and computing a signal round-trip time (RTT) for at least one transponder in the group based, at least in part, on the estimated delay.

Another particular implementation is directed to a mobile device comprising: a wireless transceiver to transmit messages to and receive messages from a wireless communication network; one or more processors to: obtain one or more messages received at the wireless transceiver comprising positioning assistance data, the positioning assistance data comprising description of attributes of a plurality of wireless transponders, the one or more messages identifying at least two of the wireless transponders as being in a group of wireless transponders having similar attributes; estimate a delay in connection with a round-trip exchange of messages with wireless transponders in the group based, at least in part, on measurements obtained from one or more wireless transponders in the group; and compute a signal round-trip time for at least one transponder in the group based, at least in part, on the estimated delay.

Another particular implementation is directed to an article comprising: a non-transitory storage medium comprising machine-readable instructions stored thereon which are executable by a special purpose computing apparatus of a mobile device to: obtain one or more messages received from a wireless communication network comprising positioning assistance data, the positioning assistance data comprising description of attributes of a plurality of wireless transponders, the one or more messages identifying at least two of the wireless transponders as being in a group of wireless transponders having similar attributes; estimate a delay in connection with a round-trip exchange of messages with wireless transponders in the group based, at least in part, on measurements obtained from one or more wireless transponders in the group; and compute a signal round-trip time for at least one transponder in the group based, at least in part, on the estimated delay.

Another particular implementation is directed to a mobile device, comprising: means for receiving one or more messages comprising positioning assistance data, the positioning assistance data comprising description of attributes of a plurality of wireless transponders, the one or more messages identifying at least two of the wireless transponders as being in a group of wireless transponders having similar attributes; means for estimating a delay in connection with a round-trip exchange of messages with wireless transponders in the group based, at least in part, on measurements obtained from one or more wireless transponders in the group; and means for computing a signal round-trip time for at least one transponder in the group based, at least in part, on the estimated delay.

Another particular implementation is directed to a method at a server, comprising: identifying a plurality of wireless transponder devices serving mobile devices in an area; determining criteria for sorting the wireless transponder devices into groups of wireless transponder devices having similar characteristics in imparting a delay in a round-trip signal exchange based, at least in part, on attributes of the wireless transponder devices; sorting the plurality of wireless transponder devices into the groups according to the criteria; transmitting, in response to a request for positioning assistance data, one or more messages to at least one mobile device comprising identities of the wireless transponder devices and an indication of the wireless transponder devices in the groups.

Another particular implementation is directed to a server, comprising: a wireless transceiver to transmit messages to and receive messages from a wireless communication network; and one or more processors to: identify a plurality of wireless transponder devices serving mobile devices in an area; determine criteria for sorting the wireless transponder devices into groups of wireless transponder devices having similar characteristics in imparting a delay in a round-trip signal exchange based, at least in part, on attributes of the wireless transponder devices; sort the plurality of wireless transponder devices into the groups according to the criteria; and initiate transmission of one or more response messages through the wireless transceiver, in response to receipt of one or more messages at the wireless transceiver for positioning assistance data, to at least one mobile device, the one or more response messages comprising identities of the wireless transponder devices and an indication of the wireless transponder devices in the groups.

Another particular implementation is directed to an article comprising: a non-transitory storage medium comprising machine-readable instructions stored thereon which are executable by a special purpose computing apparatus to: identify a plurality of wireless transponder devices serving mobile devices in an area; determine criteria for sorting the wireless transponder devices into groups of wireless transponder devices having similar characteristics in imparting a delay in a round-trip signal exchange based, at least in part, on attributes of the wireless transponder devices; sort the plurality of wireless transponder devices into the groups according to the criteria; and initiate transmission of one or more response messages, in response to receipt of one or more messages for positioning assistance data, to at least one mobile device, the one or more response messages comprising identities of the wireless transponder devices and an indication of the wireless transponder devices in the groups.

Another particular implementation is directed to an apparatus comprising: means for identifying a plurality of wireless transponder devices serving mobile devices in an area; means for determining criteria for sorting the wireless transponder devices into groups of wireless transponder devices having similar characteristics in imparting a delay in a round-trip signal exchange based, at least in part, on attributes of the wireless transponder devices; means for sorting the plurality of wireless transponder devices into the groups according to the criteria; and means for transmitting, in response to a request for positioning assistance data, one or more messages to at least one mobile device comprising identities of the wireless transponder devices and an indication of the wireless transponder devices in the groups.

It should be understood that the aforementioned implementations are merely example implementations, and that claimed subject matter is not necessarily limited to any particular aspect of these example implementations.

DETAILED DESCRIPTION

In particular applications, a mobile device may obtain a round-trip time (RTT) measurement by measuring a time difference between transmission of a probe message from a mobile device to a transponder (e.g., IEEE std. 802.11 access point (AP)) and receipt of a return message transmitted by the responder in response to the probe message. In one particular implementation, transmission of such a probe message and such a return message may be performed according to a request-to-send/clear-to-send (RTS/CTS) procedure according to IEEE std. 802.11. Prior to transmission of a probe message, a mobile device may include a first time-stamp. The transponder device may extract the first time-stamp from the probe message and include the extracted first time-stamp in the return message. In response to receipt of the response message, the mobile device may apply a second time-stamp. An RTT measurement may then obtained based, at least in part, on a difference between the first and second time-stamps, less an estimated processing latency at the transponder in transmitting the return message in response to the received probe message. In this context, such a processing latency at a transponder in transmitting a return message in response to a probe message may be referred to as a turnaround calibration factor (TCF). Difficulty in estimating TCF may lead to inaccuracies in RTT measurements, possibly leading to inaccurate position fixes at the mobile device. Components of an RTT measurement are illustrated in FIG. 1.

In one particular implementation, application, components of a TCF 10 may include a latency for acquiring a probe message at an antenna and a physical layer, received frame processing at a MAC layer (e.g., in a receive queue buffer), application processing at a host processer including retrieving frames from the MAC layer and preparing a frame for a return message, transmit frame processing at the MAC layer (e.g., in a transmit queue buffer) and a latency for transmission of the return message frame by the physical layer through the antenna. In addition to TCF 10, depending on an antenna configuration at a wireless transponder device, a wireless transponder delay may also impart a cyclic shift diversity (CSD) delay (not shown) into a round-trip message exchange to be combined with TCF 10 to impart a total delay into the round-trip message exchange. In one embodiment, such a CSD delay may originate from a multiplexing technique to transmit a signal from multiple antenna elements at a transmitter where different delays may be imparted to different antenna elements transmitting the same signal, for example.

Particular exemplary and non-limiting implementations described herein are directed to positioning techniques using features of IEEE std. 802.11 at a mobile device and a transponder device ("WiFi positioning"). It should be understood, however, that use of WiFi positioning is discussed here merely as an example wireless technology, and that other wireless technologies may be used without deviating from claimed subject matter. In WiFi positioning, a mobile device may exchange messages with an AP acting as a transponder device. It may be observed that various types of APs have different characteristics and behavior in terms of the magnitude of TCF and CSD that is imparted to a delay in a round-trip message exchange. Without knowing TCF and CSD, a mobile device may treat each wireless transponder device individually and estimate TCF and CSD characteristic separately, which may entail more computation and power consumption and also introducing higher positioning uncertainty due to larger number of unknown variables.

According to an embodiment, a mobile device may estimate a delay imparted to a round-trip message exchange for a group of multiple wireless transponder devices (e.g., APs) where the APs are grouped by a similarity of particular attributes (e.g., model, make, vendor, etc.). The mobile device may then apply the delay in measuring RTT for message exchanges with multiple wireless transponders in the group. Grouping of wireless transponder devices may allow a mobile device to obtain more accurate and reliable estimates of TCF and CSD based on particular attributes (e.g., AP model description) and take advantage of consistent behavior among APs with common attributes. This may enable improvements in measuring RTT and saving power by reducing computation and time to fix.

Figure 2:
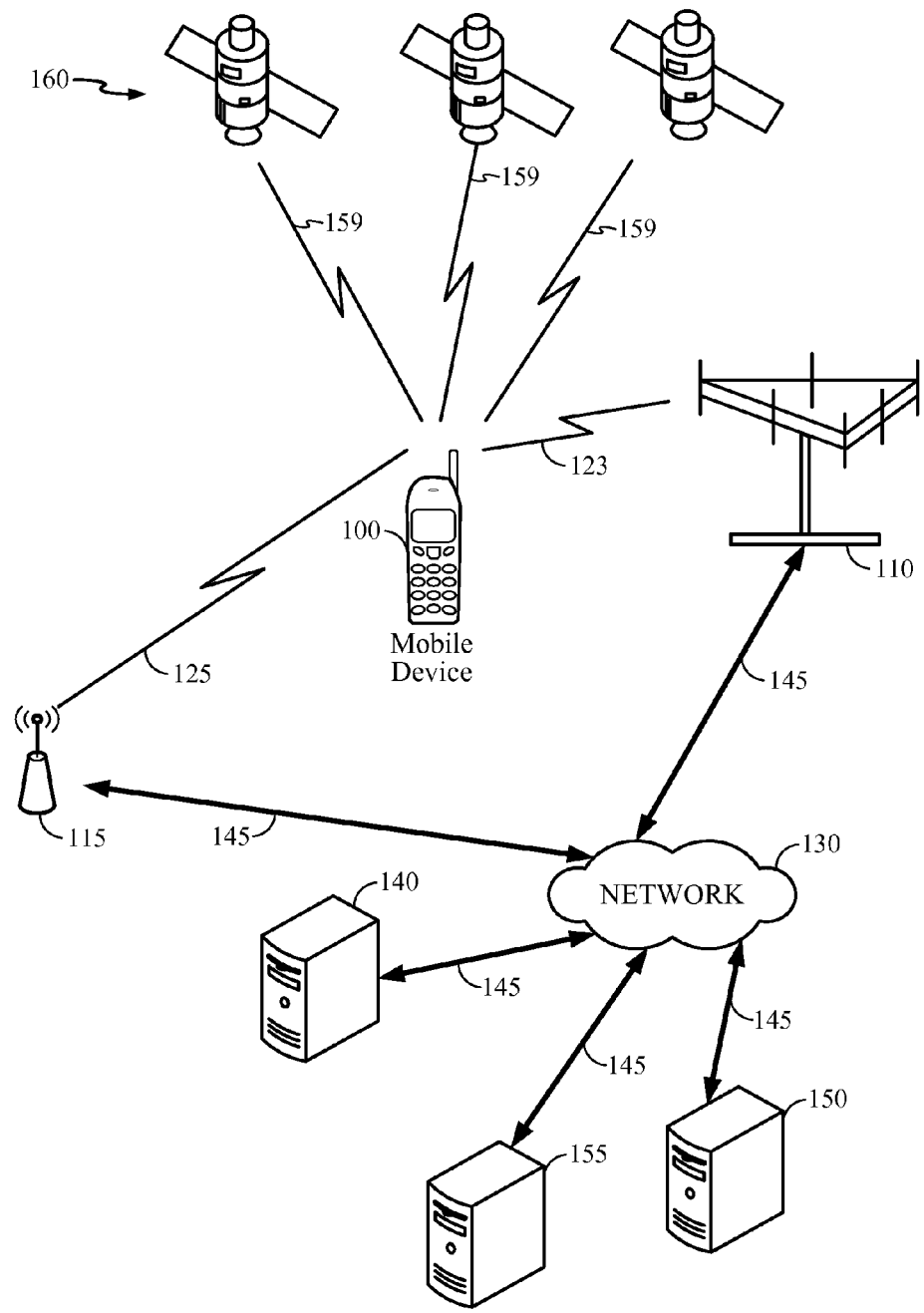
FIG. 2 is a system diagram illustrating certain features of a system containing a mobile device, in accordance with an implementation.

In certain implementations, as shown in FIG. 2, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, or alternatively, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123. Similarly, mobile device 100 may transmit wireless signals to, or receive wireless signals from local transceiver 115 over wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 150. In another implementation, network 130 may comprise cellular communication network infrastructure such as, for example, a base station controller or master switching center (not shown) to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. In alternative implementations, angles of arrival or departure may be used in lieu of or in combination with measurements of range or signature recognition in a radio heatmap for estimating a location of a mobile device. It should be understood, however, that these are merely examples of values that may be stored in a radio heatmap, and that claimed subject matter is not limited in this respect.

In other implementations, mobile device may comprise sensors such as inertial sensors (e.g., accelerometers and gyroscopes) and/or environment sensors (e.g., imagers, microphone, magnetometer, temperature sensor, barometric pressure sensor) to aid in positioning techniques. For example, a mobile device may employ measurements and/or traces from an inertial sensor to estimate its location using dead reckoning techniques.

In particular implementations, mobile device 100 may receive positioning assistance data for indoor positioning operations from servers 140, 150 or 155. For example, such positioning assistance data may include locations and identities of wireless transmitters/transponders positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters (e.g., including wireless transponder devices), routeability graphs, just to name a few examples. Other positioning assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

According to an embodiment, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

FIG. 3 illustrates a request for positioning assistance data in a message at event A from a mobile device 200 and a response message at event B including positioning assistance data according to an embodiment. As pointed out above, positioning assistance data from a location server may include the locations and identities (e.g., MAC addresses) of APs for use in WiFi positioning. In particular implementations, positioning assistance data may specify other attributes of APs that are indicative of how the APs may behave in responding to probe messages such as imparting a delay in transmission of a responsive return message. These attributes may include, but are not necessarily limited to, an AP vendor, model, WLAN chip model or WLAN chip vendor. Sharing common attributes, APs in a group may impart a similar TCF and/or CSD delay in a response to a probe message. Accordingly, in computing RTT measurements in a message exchange with an AP in a particular group, mobile device 200 may subtract from the total time for the message exchange an expected delay associated with the particular group.

According to an embodiment, a server 202 serving a venue may collect AP model identifiers and define groups of APs serving the venue according to attributes. Server 202 may further assign to a group a group identifier (group ID) to which APs in the group are allocated or associated. Server 202 may then provide position assistance data to mobile device 200, indicating associations of APs in groups and attributes of APs (e.g., {AP group ID, AP vendor, AP model, AP WLAN chip vendor, AP WLAN chip model}). This is shown by example in FIG. 4. However, this is merely an example of how positioning assistance data may provide attributes of APs, and claimed subject matter is not limited in this respect.

While server 202 may provide positioning assistance data grouping identified APs by attributes, in an alternative implementation, mobile device 200 may use AP attributes in positioning assistance data to group APs (e.g., either based on a given AP group ID, or sorting APs based on AP model information) and then estimate a delay (e.g., from TCF and/or CSD) per AP group. In particular implementations, an AP may inject CSD to enhance spatial diversity. As pointed out above, in addition to TCF, a CSD may contribute to a delay receiving a return signal in response to a probe signal. A CSD delay component may be matched to a particular pattern that is known or estimated per a particular AP group. Here, different lengths for CSD imparted by APs within this particular group may be matched with different possible CSD lengths (e.g. {−200 ns, −100 ns, 0 ns} vs {−100 ns, −50 ns, 0 ns}).

Figure 5:
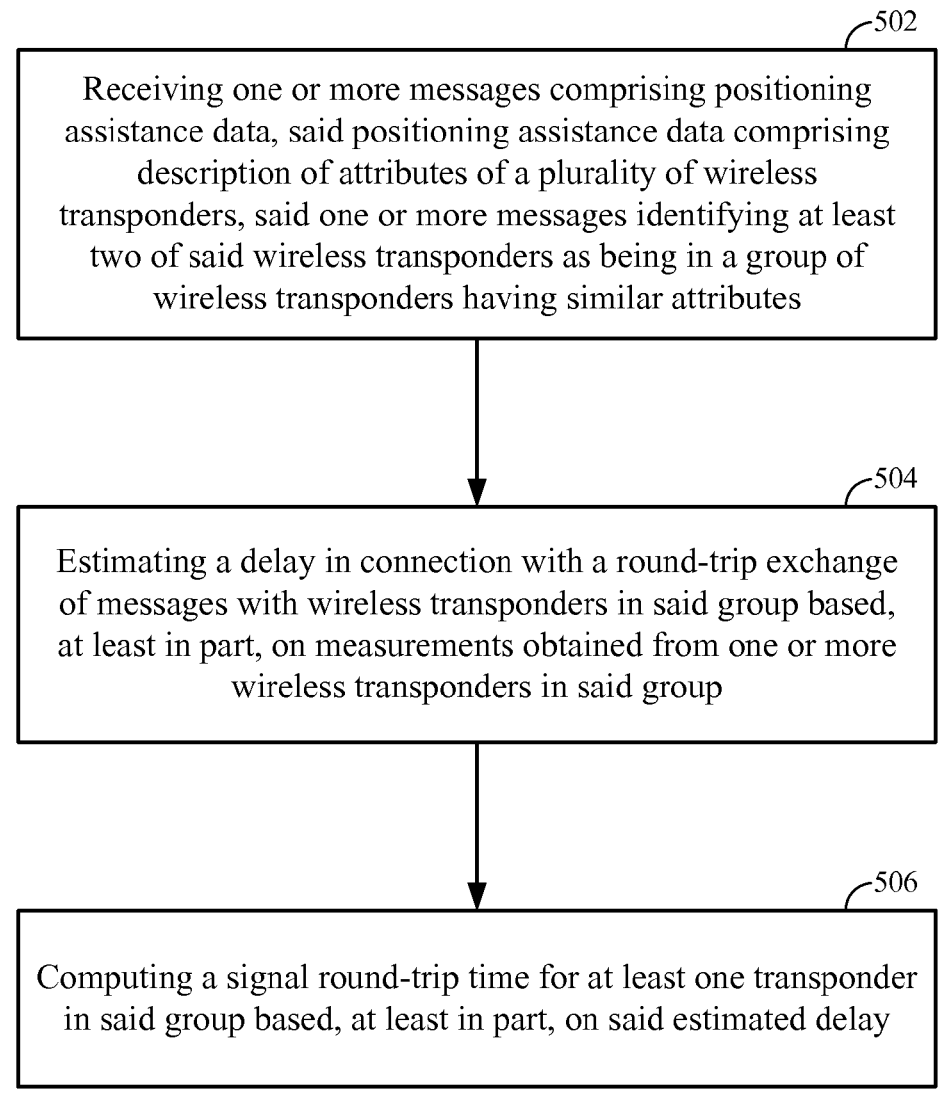
FIG. 5 is a flow diagram of a process for applying an estimated delay in computing an RTT according to an embodiment.

FIG. 5 is a flow diagram of a process for applying an estimated delay in computing an RTT according to an embodiment. The process of FIG. 5 may occur, for example, at a mobile device such as mobile device 100. Block 502 may receive one or more messages comprising positioning assistance data from, for example, a location server in response to a previous request message. Among other things, positioning assistance data received at block 502 may include a description of attributes of a plurality of wireless transponders. Positioning assistance data received at block 502 may also, in an embodiment, identifying at least two wireless transponders as being in a group of wireless transponders having similar attributes. Alternatively, a mobile device may form groups of wireless transponders based, at least in part, on attributes provided in the positioning assistance data. A non-limiting example of such positioning assistance data is provided in FIG. 4 discussed above.

For a particular group of wireless transponders identified in positioning assistance data provided at block 502, block 504 may estimate a delay in connection with wireless transponders in the group based, at least in part, on measurements obtained from one or more wireless transponders in the group. For example, block 504 may compute an estimated TCF and/or CSD for wireless transponders in the group using one of the techniques described above. As described above, a mobile device may transmit a probe signal to one of the wireless transponders and measure a time of receipt of a return signal in response to the probe signal for estimating RTT. Based, at least in part, on the estimated delay computed at block 504, block 506 may estimate an RTT for one or more transponders in the group.

According to an embodiment, a mobile device may estimate a response delay imparted by a wireless transponder device in a group of wireless transponder devices at block 504 using any one of several techniques. First, the mobile device may estimate its position using any one of several techniques mentioned above such as, for example, trilateration using measurements of ranges to APs based on received signal strength (e.g., for particular high RSSI above −50 or −60 dBm). Second, the mobile device may measure a distance d(i) from its estimated location to a known location of a wireless transponder device APLoc(i) (e.g., provided in positioning assistance data) according to expression (1) as follows:

$$d(i)=\|mobileLoc-APLoc(i)\|, \quad (1)$$

where mobileLoc is and estimated location of the mobile device.

A value of a measured response delay RD(i) imparted by a wireless transponder device i in a group of wireless transponder devices in an exchange of messages between a mobile device and the wireless transponder device i may be computed according to expression (2) as follows:

$$RD(i)=(T_{RX}-T_{TX})/2-d(i)/c, \quad (2)$$

where:
$T_{TX}$ is a time of transmission of a probe message at the mobile device to the wireless transponder device;
$T_{RX}$ is a time of receipt of a return message at the mobile device (transmitted by the wireless transponder device in response to receipt of the probe message); and
c is the speed of light.

For a large number of measurements of RD for messages exchanges between a mobile device and wireless transponder devices in a group of wireless transponder devices, a histogram may be formed. Outliers for RD measurements for within a particular group may be removed (e.g., RD for an AP group may be expected to be same or close within a certain bound (e.g., 50.0 ns)). For example, RD measurements that are more than one standard deviation beyond a median RD in the histogram may be removed. A peak value in a resulting histogram may be selected as an estimated TCF measurements for APs within the group.

As pointed out above, a measurement RD may include a component of CSD added to a TCF portion. If a wireless transponder device injects a CSD in addition to a TCF in transmitting a return signal in response to a probe signal, a recipient mobile device acquire either a return message component delayed by a TCF but with no CSD or a return message component delayed by a the injected CSD in addition to the TCF. A measured value for RD(i) in expression (2) may be skewed by an amount of a CSD depending on which component of the return message is acquired for the measurement. Accordingly, if a group of wireless transponder devices are configured to inject a CSD into a return signal, a histogram of measurements of RD(i) may reflect a bi-modal distribution with two peaks. A first peak in the bi-modal distribution may provide an estimate for TCF while the second peak in the bi-modal distribution may provide an estimate of CSD added to the TCF. According to an embodiment, outlying measurements separated by an initial CSD estimate by more than a threshold amount (e.g., 250.0 ns 200.0 ns is the largest known CSD value) may be discarded.

According to an embodiment, a bi-modal or multi-modal distribution revealed by a histogram of RD for a group of wireless transponder devices may be compared with any known CSD patterns. If the bi-modal or multi-modal distribution appears to approximate the known pattern, the known pattern may be assumed to be employed by the wireless transponder devices in the group.

Block 506 in FIG. 5 may apply hypothesis testing in computing RTT from an exchange of messages between a mobile device and a wireless transponder device. If it is determined that a group of wireless transceiver devices are configured to inject a CSD in addition to TCF, it is uncertain whether an acquired return signal includes a transmission delay including a CSD in addition to TCF, or TCF with no injected CSD. This ambiguity presents two hypotheses as follows:

$$RTT=T_{RX}-T_{TX}-TCF_{est}, \quad (i)$$

$$RTT=T_{RX}-T_{TX}-(TCF_{est}+CSD), \quad (ii)$$

where:
$TCF_{est}$ is an estimated value of TCF (e.g., based on peak of a histogram);

In a particular implementation, a mobile device may obtain a rough measurement of range to the wireless transponder device based, at least in part, on an RSSI signal value of the acquired return message. For example, the hypothesis that most closely aligns with the RSSI of the acquired return message may be selected for computing RTT. In another implementation, different hypotheses for RTT may be tested by application to a position estimation process (e.g., using trilateration and/or radio heatmap signature matching) and evaluating a measurement residual.

Figure 6:
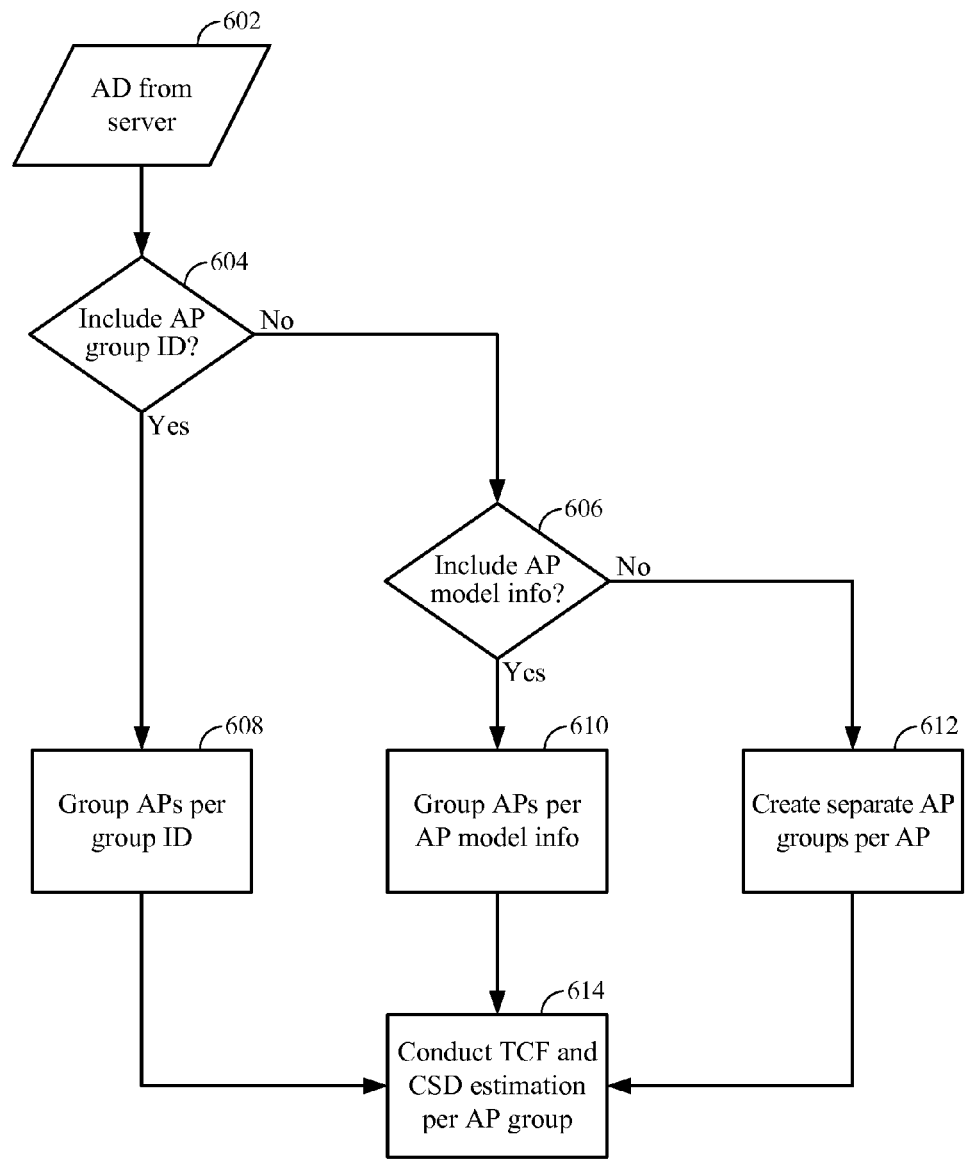
FIG. 6 is a flow diagram illustrating a process for estimating TCF and cyclic shift diversity (CSD) for wireless transponder devices according to an embodiment.

FIG. 6 is a flow diagram illustrating a process for estimating TCF and CSD for AP transponders according to an alternative embodiment. At event 602, a mobile device may receive positioning assistance data (e.g., in response to a request) from a location server as discussed above. In particular implementations, the received positioning assistance data may include, for example, locations of wireless transponders devices, transmission power levels, etc., to assist in positioning operations as discussed above. As pointed out above, positioning assistance data received at event 602 may also identify attributes of a wireless transponder device as shown in the table of FIG. 4. If positioning assistance data received at event 602 identifies a wireless transponder device with a group identifier as determined at diamond 604, block 608 may group the identified wireless transponder devices with a predefined group according to the group identifier. Otherwise, an identified wireless transponder device may be associated with a group based on attributes. For example, if positioning assistance data received at event 602 includes a model number for an identified wireless transponder device as determined at diamond 606, block 610 may associate the identified wireless transponder device with a group based, at least in part, on a model number provided. For example, block 610 may characterize a particular model number of wireless transponder device as having particular TCF and/or CSD behavior that is the same as or similar to that of a predefined group of wireless transponder devices. Otherwise, if no model numbers are provided with positioning assistance data, block 612 may create new or separate local group(s) for identified wireless transponder devices identified in the positioning assistance data received at event 602. Block 614 may estimate TCF and/or CSD for a particular group of wireless transponder devices as discussed above.

Figure 7:
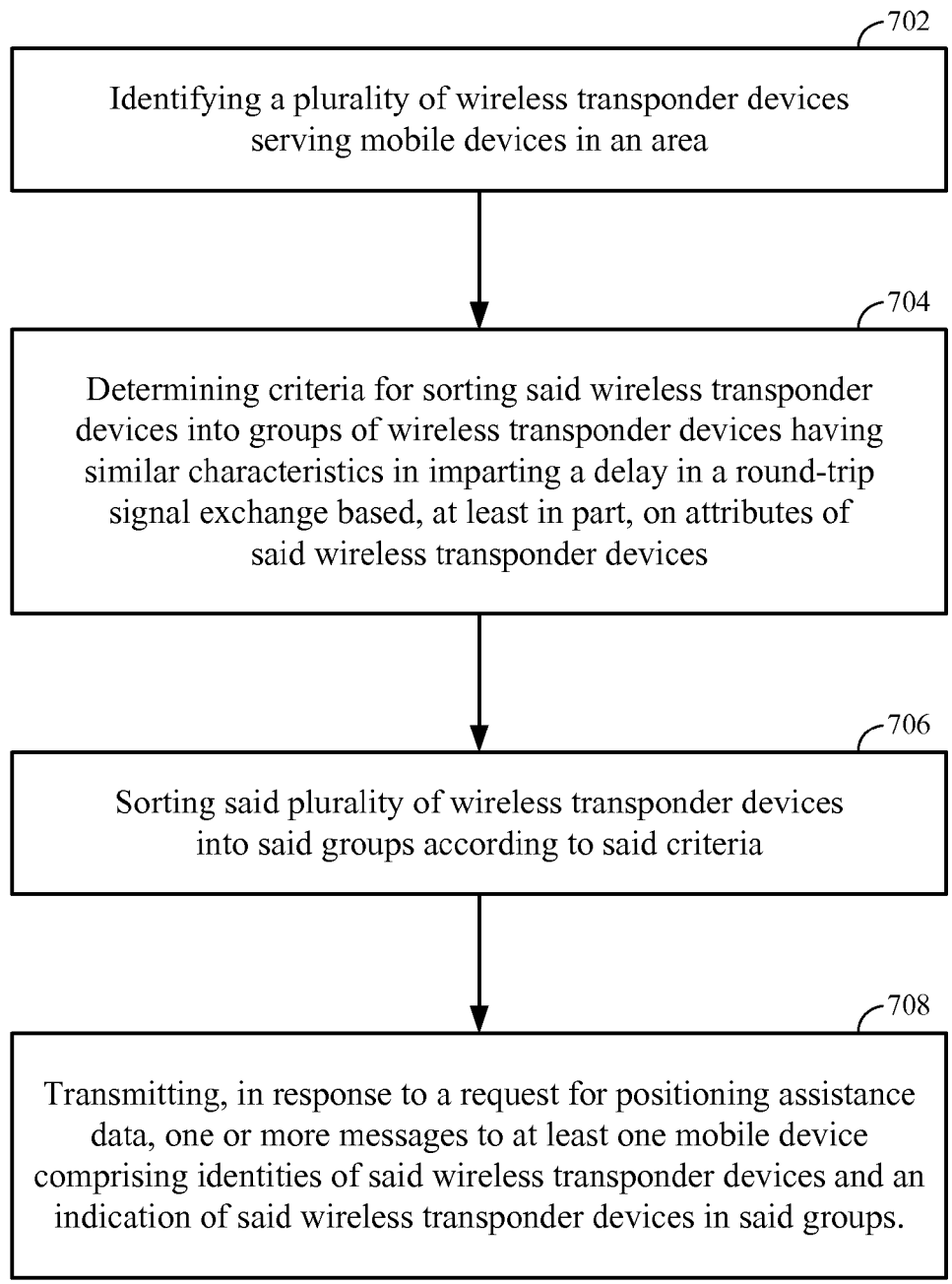
FIG. 7 is a flow diagram of a process for providing positioning assistance data to one or more mobile devices according to an embodiment.

FIG. 7 is a flow diagram of a process for providing positioning assistance data to one or more mobile devices according to an embodiment. In particular implementations, aspects of operations shown in FIG. 7 may be performed in real-time in response to requests for positioning assistance data while other aspects may be performed off-line. In other implementations, all or portions of the aspects of operations shown in FIG. 7 may be performed at a server such any of servers 140, 150 or 155 (FIG. 2). At block 702, a plurality of wireless transponder devices servicing mobile devices in an area may be identified. For example, a venue operator may pre-program a database with the identities (e.g., MAC address) of wireless transponder devices, their locations and other attributes such as, for example, attributes provided in the example of FIG. 4 above. Block 704 may comprise determining criteria for sorting wireless transponder devices identified in block 702 into groups of wireless transponder devices having similar characteristics based on attributes (e.g., model number, vendor, chip model, chip vendor). For example, such similar characteristics may include characteristics in imparting a delay in an RTT signal exchange (e.g., TCF and/or CSD). Block 706 may sort wireless transponder devices identified at block 702 according to criteria determined at block 704. Based at least in part on available attributes of wireless transponder devices identified at block 702, block 706 may sort the identified wireless transponder devices into groups. For example, block 706 may sort wireless transponder devices based, at least in part, on model number, vendor, chip model, chip vendor if such attributes are available. This sorting of wireless transponder devices may be included with positioning assistance data that is to be stored provided to mobile devices in response to requests. For example, block 708 may, in response to a request, transmit one or more messages to at least one mobile device comprising the identities of the wireless transponder devices and an indication of the wireless transponder devices that are members of the groups in block 706. As discussed above, with knowledge of a particular wireless transponder device's membership in a group, a mobile device may estimate a delay in connection with a RTT exchange of messages with the particular wireless transponder device.

Figure 8:
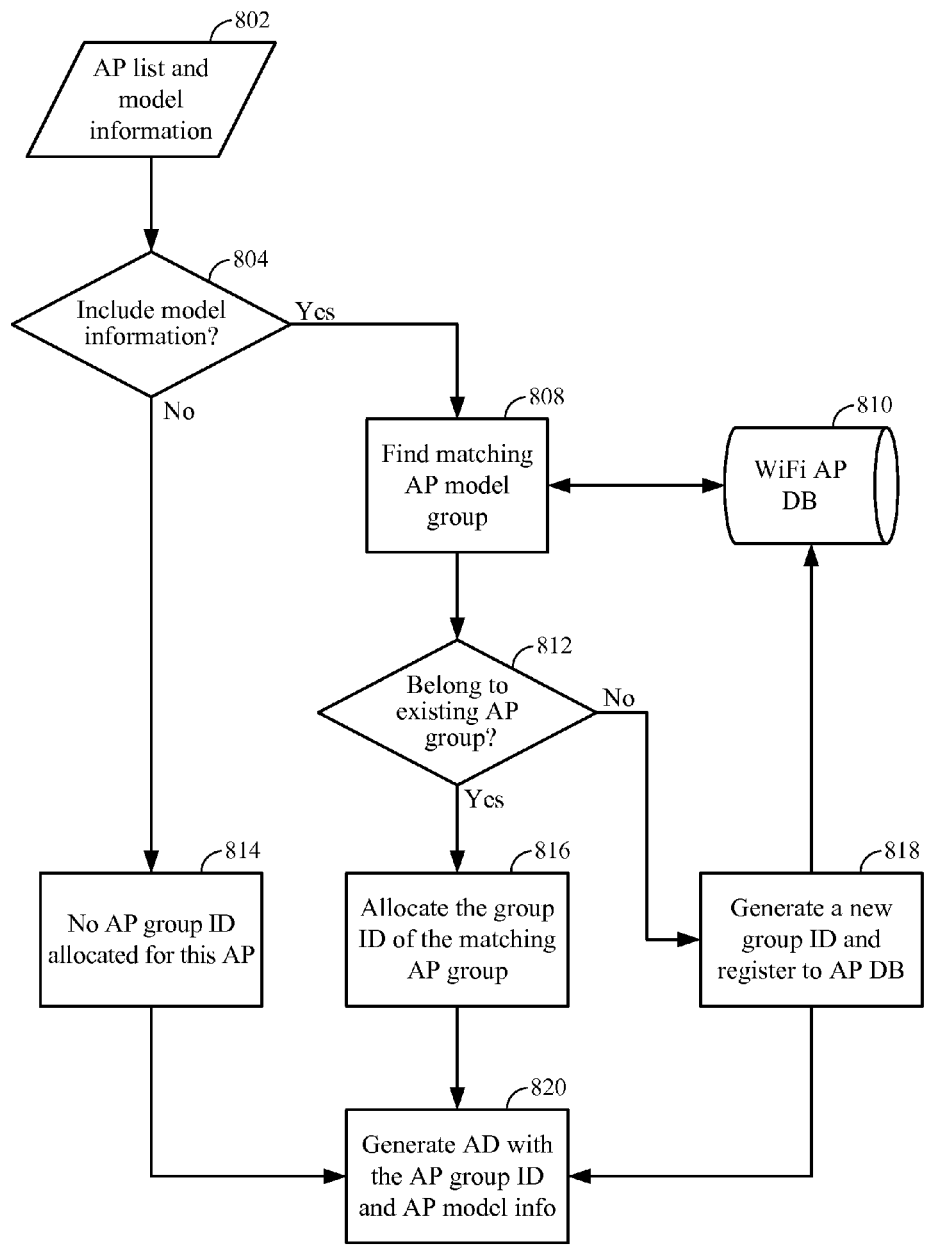
FIG. 8 is a flow diagram illustrating a process for generating positioning assistance data including a grouping access points (APs) with like attributes according to an embodiment.

FIG. 8 is a flow diagram illustrating a process for grouping wireless transponders according to an alternative embodiment. All or portions of operations shown in FIG. 8 may be performed at least partially in a background or off-line process (e.g., at a server such as at any of servers 140, 150 or 155). In a particular implementation, the process of FIG. 8 may be used to generate positioning assistance data to be provided to mobile devices in response to requests as discussed above. Event 802 may comprise obtaining a list of identifiers of wireless transponder devices (e.g., MAC addresses) serving an area including attributes of the wireless transponder devices (e.g., location, model number, vendor, chip model, chip vendor). Event 802 may be performed by a venue operator (e.g., through manual entry or up load) or by an autodiscovery technique, for example. As determined at diamond 804, if for a particular wireless transponder device identified in an AP list at event 802, model identification is provided, block 808 may attempt to match the particular wireless transponder device with a particular make and/or model number based on the provided model identification. Based on any available known attributes of the particular wireless transponder device (e.g., based on the model identification), block 808 may access WiFi AP database 810 to obtain TCF/CSD characteristics (e.g., TCF of 16500 ns). As determined at diamond 812, if a particular wireless transponder device has attributes characteristic of an existing group of wireless transponder device, block 816 may allocate the particular wireless transponder device to the existing group by, for example, updating records and/or data structures associating wireless transponder devices to the existing group and associate the particular wireless transponder device with a group ID of the existing group. Otherwise, block 818 may initialize a new group including identified by a new group ID to include the particular wireless transponder device. Finally, block 820 may generate new positioning assistance data to include group identifiers and associated attributes (e.g., model numbers of wireless transponder devices corresponding to the group).

In one particular implementation, diamond 804 may evaluate only partial descriptors of an AP model (e.g., AP vendor and AP model, but no WLAN chip). Here, block 808 may still attempt to find a match with an AP model group. If the AP matches multiple different possible AP groups, block 808 may associate the AP with multiple possible group IDs or no group ID. In addition, a certain grouping of APs may merge with one or more other groupings of APs to form a single group (e.g., if they have similar TCF and/or CSD characteristics). Similarly, a single grouping of APs may be partitioned into multiple groups of APs (e.g., if identifiable subgroups exhibit distinct or different TCF and/or CSD characteristics). Also, within any particular AP group, TCF and CSD estimates may include both an average value and a standard deviation (or other measure of uncertainty).

In another implementation, if no AP model information is provided, diamond 804 may evaluate a portion of a MAC address from the AP (e.g., first six octets) to obtain a hint as to a manufacturer of the device. For example, the first three octets of a MAC address may represent an organizationally unique identifier (OUI), which may be assigned to a particular AP vendor while the following three octets may be network interface controller specific. Accordingly, diamond may apply these attributes in classifying APs along with other attributes.

Figure 9:
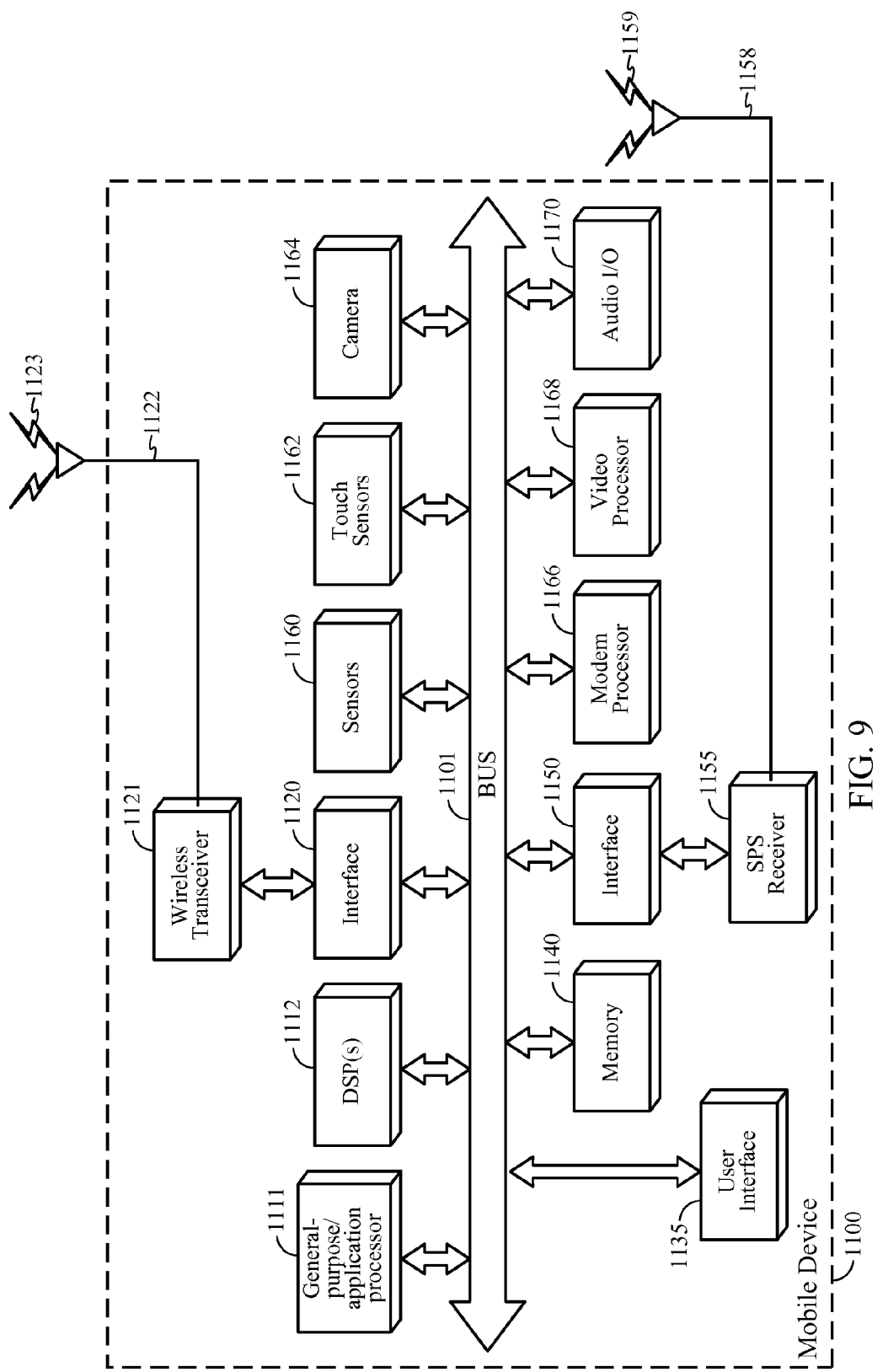
FIG. 9 is a schematic block diagram illustrating an exemplary device, in accordance with an implementation.

FIG. 9 is a schematic diagram of a mobile device according to an embodiment. Mobile device 100 (FIG. 2) may comprise one or more features of mobile device 1100 shown in FIG. 9. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver 1121) for use in performing positioning operations may be performed in memory 1140 or registers (not shown). As such, general-purpose processor(s) 1111, memory 1140, DSP(s) 1112 and/or specialized processors may provide a location engine for use in processing measurements to estimate a location of mobile device 1100. In a particular implementation, general purpose processor(s) 1111 and/or DSP(s) 1112 may execute machine-readable instructions stored on memory 1140 to perform all or portions of the actions or operations of the process shown in FIG. 5 (e.g., blocks 502, 504 and 506), or may perform all or portions of the actions or operations shown in FIG. 6 (e.g., event 602, diamonds 604 and 606, and blocks 608, 610, 612 and 614).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/ application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 10:
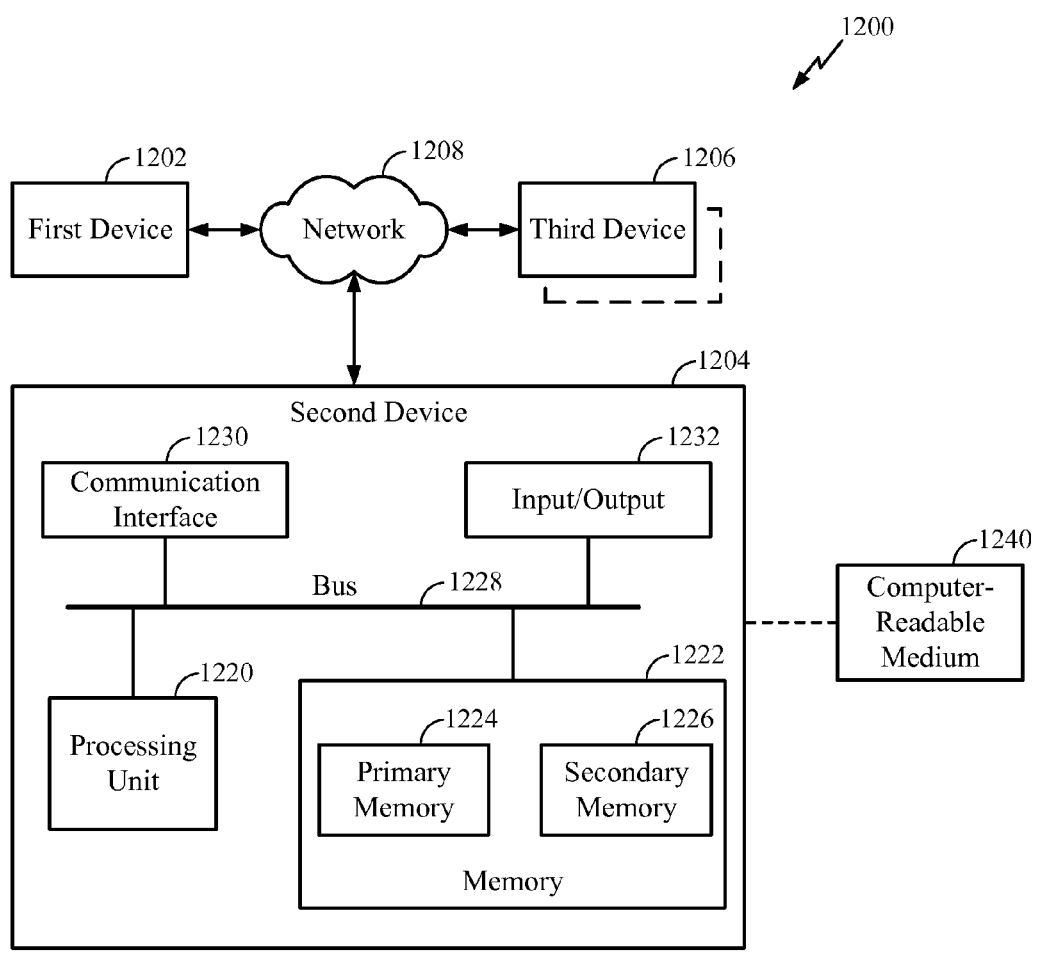
FIG. 10 is a schematic block diagram of an example computing platform in accordance with an implementation.

FIG. 10 is a schematic diagram illustrating an example system 1200 that may include one or more devices configurable to implement techniques or processes described above, for example, in connection with FIG. 2. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac or descriptions and locations of wireless transmitters/transponders. Also, in an aspect, wireless communications network 1208 may comprise one or more wireless access points, for example. However, claimed subject matter is not limited in scope in these respects.

First device 1202, second device 1204 and third device 1206, as shown in FIG. 10, may be representative of any device, appliance or machine (e.g., such as local transceiver 115 or servers 140, 150 or 155 as shown in FIG. 2) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/ system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 2), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, processing unit 1220 may execute machine-readable instructions stored on memory 1222 to perform all or portions of actions or operations set out in the process of FIG. 7 (e.g., blocks 702, 704, 706 and 708), or all or portions of actions or operations set out in the process of FIG. 8 (e.g., event 802, diamonds 804 and 812, and blocks 808, 814, 816, 818 and 820).

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at a mobile device, comprising:
receiving one or more messages comprising positioning assistance data, said positioning assistance data comprising description of attributes of a plurality of access points (APs), said one or more messages identifying at least two of said plurality of APs as being in a group of APs having similar attributes, wherein said group of APs have an attribute in common comprising an AP model attribute, an AP vendor attribute or an AP LAN chip vendor, or combination thereof;
estimating a delay in connection with a round-trip exchange of messages with APs in said group of APs based, at least in part, on measurements obtained from one or more APs in said group of APs, wherein said delay comprises a turnaround calibration factor (TCF) delay or a cyclic shift diversity (CSD) delay or combination thereof and wherein estimating said delay further comprises: measuring a duration of time between transmission of a probe message and receipt of a return message in an exchange of messages with at least one AP in said group of APs;
estimating a range to said at least one AP of said group of APs based, at least in part, on an estimated location of said mobile device contemporaneous with said exchange of messages;
and estimating said delay based, at least in part, on a comparison of said estimated range to said duration of time; and computing a signal round-trip time (RTT) for at least one AP in said group of APs based, at least in part, on said estimated delay.

2. A mobile device comprising:
a wireless transceiver to transmit messages to and receive messages from a wireless communication network;
one or more processors to:
obtain one or more messages received at said wireless transceiver comprising positioning assistance data, said positioning assistance data comprising description of attributes of a plurality of access points (APs), said one or more messages identifying at least two of said plurality of APs as being in a group of APs having similar attributes, wherein said group of APs have an attribute in common comprising an AP model attribute, an AP vendor attribute or an AP LAN chip vendor attribute or a combination thereof;
estimate a delay in connection with a round-trip exchange of messages with APs in said group of APs based, at least in part, on measurements obtained from one or more APs in said group of APs, wherein said delay comprises a turnaround calibration factor (TCF) delay or a cyclic shift diversity (CSD) delay or combination thereof and wherein to estimate said delay further to comprise: measure a duration of time between transmission of a probe message and receipt of a return message in an exchange of messages with at least one AP in said group of APs; estimate a range to said at least one AP of said group of APs based, at least in part, on an estimated location of said mobile device contemporaneous with said exchange of messages; and estimate said delay based, at least in part, on a comparison of said estimated range to said duration of time; and
compute a signal round-trip time for at least one AP in said group of APs based, at least in part, on said estimated delay.

3. An apparatus for use in a mobile device, said apparatus comprising:
means for receiving one or more messages comprising positioning assistance data, said positioning assistance data comprising description of attributes of a plurality of access points (APs), said one or more messages identifying at least two of said plurality of APs as being in a group of APs having similar attributes, wherein said group of APs have an attribute in common comprising an AP model attribute, an AP vendor attribute or an AP LAN chip vendor, or combination thereof;
means for estimating a delay in connection with a round-trip exchange of messages with APs in said group of APs based, at least in part, on measurements obtained from one or more APs in said group of APs, wherein said delay comprises a turnaround calibration factor (TCF) delay or a cyclic shift diversity (CSD) delay or combination thereof and wherein said means for estimating said delay further comprises: means for measuring a duration of time between transmission of a probe message and receipt of a return message in an exchange of messages with at least one AP in said group of APs; means for estimating a range to said at least one AP of said group of APs based, at least in part, on an estimated location of said mobile device contemporaneous with said exchange of messages; and means for estimating said delay based, at least in part, on a comparison of said estimated range to said duration of time; and
means for computing a signal round-trip time (RTT) for at least one AP in said group of APs based, at least in part, on said estimated delay.

4. An article for use in a mobile device, said article comprising a non-transitory computer readable medium having stored therein computer implementable instructions executable by a processing unit in said mobile device to:
receive one or more messages comprising positioning assistance data, said positioning assistance data comprising description of attributes of a plurality of access points (APs), said one or more messages to identify at least two of said plurality of APs as being in a group of APs having similar attributes, wherein said group of APs have an attribute in common comprising an AP model attribute, an AP vendor attribute or an AP LAN chip vendor, or combination thereof;
estimate a delay in connection with a round-trip exchange of messages with APs in said group of APs based, at least in part, on measurements obtained from one or more APs in said group of APs, wherein said delay to comprise a turnaround calibration factor (TCF) delay or a cyclic shift diversity (CSD) delay or combination thereof, and wherein said to estimate said delay further to comprise: measure a duration of time between transmission of a probe message and receipt of a return message in an exchange of messages with at least one AP in said group of APs; estimate a range to said at least one AP of said group of APs based, at least in part, on an estimated location of said mobile device contemporaneous with said exchange of messages; and estimate said delay based, at least in part, on a comparison of said estimated range to said duration of time; and
compute a signal round-trip time (RTT) for at least one AP in said group of APs based, at least in part, on said estimated delay.

* * * * *